(12) United States Patent
Takagi

(10) Patent No.: US 7,903,964 B2
(45) Date of Patent: Mar. 8, 2011

(54) IMAGING APPARATUS WITH ROTATABLE GRIP AND MONITOR PORTIONS

(75) Inventor: Noriaki Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 12/056,145

(22) Filed: Mar. 26, 2008

(65) Prior Publication Data

US 2008/0240703 A1     Oct. 2, 2008

(30) Foreign Application Priority Data

Mar. 28, 2007     (JP) .................. 2007-083402

(51) Int. Cl.
*G03B 13/02* (2006.01)
*G03B 15/05* (2006.01)

(52) U.S. Cl. ............. 396/383; 396/176; 348/333.06

(58) Field of Classification Search ............ 396/374, 396/383, 535–541, 176; 348/333.06, 333.01; D14/138 AB, 138 C, 138; D16/208
See application file for complete search history.

(56) References Cited

U.S. PATENT DOCUMENTS

| | | | |
|---|---|---|---|
| 6,215,524 B1 * | 4/2001 | Shiozaki ............... | 348/376 |
| 7,084,919 B2 | 8/2006 | Shibata et al. | |
| D559,812 S * | 1/2008 | Bradford et al. ....... | D14/138 AB |
| D560,183 S * | 1/2008 | Kim et al. ............. | D14/138 AB |
| D560,635 S * | 1/2008 | Kim et al. ............. | D14/138 AA |
| D568,281 S * | 5/2008 | Lee ........................ | D14/138 AB |
| D568,283 S * | 5/2008 | Kim et al. ............. | D14/138 AB |
| 2005/0282596 A1 * | 12/2005 | Park et al. .............. | 455/575.3 |
| 2006/0097927 A1 * | 5/2006 | Satoh et al. ............ | 343/702 |

FOREIGN PATENT DOCUMENTS

| | | | |
|---|---|---|---|
| JP | 2001-169166 | | 6/2001 |
| JP | 2004266694 A | * | 9/2004 |
| JP | 2004-304458 | | 10/2004 |
| JP | 2005-086252 | | 3/2005 |

OTHER PUBLICATIONS

3Dnews.ru article on Secomm 2006 disclosing Haier N60 phone, dated May 11, 2006, relevant sections and translation <http://www.3dnews.ru/editorial/secomm2006/print>.*

Mobiset.ru article on Haier N60 phone, original and translation <http://www.mobiset.ru/articles/text/?id=450>.*

Japanese Office Action issued on Feb. 4, 2009, for corresponding Japanese Patent Application JP 2007-083402.

* cited by examiner

*Primary Examiner* — Clayton E Laballe
*Assistant Examiner* — Leon W Rhodes
(74) *Attorney, Agent, or Firm* — K&L Gates LLP

(57) ABSTRACT

An imaging apparatus has a grip portion, a camera portion, and a monitor portion for displaying an image captured by the camera portion. The camera portion has an imaging optical system and an imaging device for capturing the image of a subject guided by the imaging optical system. The grip portion has a grip casing resembling a flat plate. The casing has a width greater than its thickness and a length greater than the width. The camera portion is connected to a longitudinal end of the grip casing rotatably about a first axis extending along the width. The monitor portion is connected to the camera portion so as to be rotatable together with the camera portion about the first axis and is connected rotatably about a second axis perpendicular to the first axis. The imaging optical system of the camera portion has an optical axis located on the first axis.

9 Claims, 10 Drawing Sheets

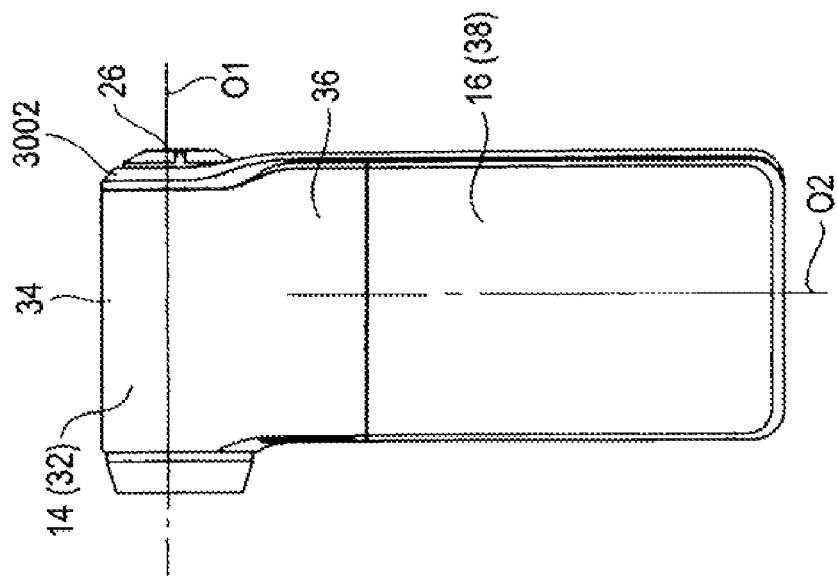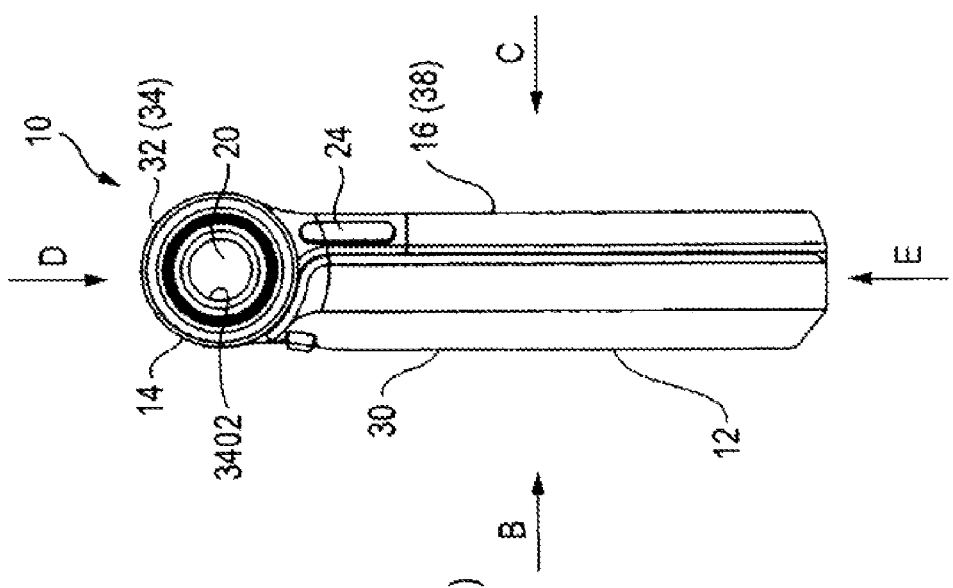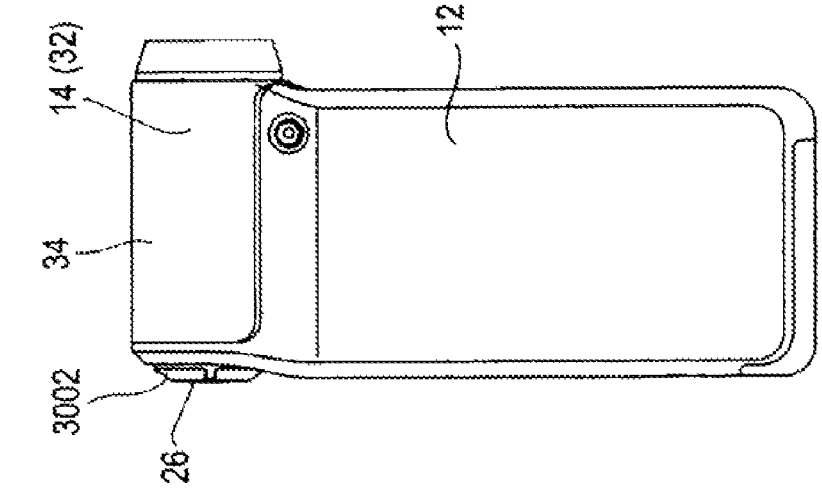

IMAGING APPARATUS WITH ROTATABLE GRIP AND MONITOR PORTIONS

CROSS REFERENCES TO RELATED APPLICATIONS

The present application claims priority to Japanese Patent Application JP 2007-083402 filed in the Japanese Patent Office on Mar. 28, 2007, the entire contents of which being incorporated herein by reference.

BACKGROUND

The present application relates to an imaging apparatus.

A foldable structure having a grip portion, a camera portion, and a monitor portion has been proposed as an imaging apparatus such as a digital still camera. The grip portion assumes a form of a flat plate. The camera portion has an imaging optical system and an imaging device for capturing an image of a subject guided by the imaging optical system. The monitor portion assumes a form of a flat plate and displays the image captured by the camera portion. The grip portion and the monitor portion are rotatably connected together via a pivot. The structure can be folded by superimposing the grip portion and monitor portion and closing them.

A structure having a camera portion integrally incorporated in a grip portion has been offered as such an imaging apparatus (see, JP-A-2001-169166 (patent reference 1)).

Furthermore, another imaging apparatus having a connecting portion in the form of a flat plate and rotatably connected to a grip portion via a pivot has been offered. A monitor portion and a camera portion are mounted to the connecting portion. Thus, the monitor portion and camera portion are swung about the pivot of the connecting portion (see, JP-A-2004-304458 (patent reference 2)). In this imaging apparatus, the pivot of the connecting portion is spaced from the optical axis of the camera portion.

In the former imaging apparatus, the camera portion is integrally incorporated in the grip portion and so if the grip portion is swung according to the camera angle, the camera portion is swung (rotated) about the pivot together with the grip portion. As a result, there arises the problem that the captured image rotates about the pivot.

Accordingly, it may not be possible to vary the posture of the grip portion while maintaining the posture of the camera portion. Consequently, there is the disadvantage that limitations are imposed on the posture of the grip portion during shooting.

Furthermore, in the latter imaging apparatus, the pivot of the connecting portion is spaced from the optical axis of the camera portion. Therefore, if the grip portion is swung about the pivot of the connecting portion, the camera's shooting range is swung about the pivot of the connecting portion and deviates. Consequently, the shooting range and the picture composition would be required to be adjusted according to the deviation. This creates inconvenience in use.

SUMMARY

Thus, it is desirable to provide an imaging apparatus whose controllability can be improved easily.

An imaging apparatus according to an embodiment has: a grip portion; a camera portion having an imaging optical system and an imaging device for capturing an image of a subject guided by the imaging optical system; and a monitor portion for displacing the image captured by the camera portion. The grip portion has a grip portion casing in the form of a flat plate that has a width greater in dimension than the thickness and a length greater in dimension than the width. The camera portion is connected to a longitudinal end of the grip portion casing rotatably about a first axis extending in the direction of the width. The monitor portion is connected to the camera portion so as to be rotatable together with the camera portion about the first axis. The monitor portion is also connected to the camera portion rotatably about a second axis perpendicular to the first axis. The optical axis of the imaging optical system of the camera portion is located on the first axis.

With this imaging apparatus according to an embodiment, photography is performed by the camera portion while visually checking the image on the monitor portion and gripping the grip portion.

Furthermore, if the angular relationship of the camera portion and monitor portion to the grip portion varies, in other words, if the monitor portion is kept at rest and the angular relationship of the grip portion to the monitor portion is varied to permit a desired subject to be photographed, the camera portion does not rotate. In addition, the optical axis of the imaging optical system does not move. Therefore, photography can be performed while the grip portion has been swung to a position where the user can easily grip the grip portion. This is advantageous in improving the controllability of the imaging apparatus.

Additional features and advantages are described herein, and will be apparent from the following Detailed Description and the figures.

BRIEF DESCRIPTION OF THE FIGURES

FIG. 1A is a front elevation of an imaging apparatus 10, and in which the apparatus is in a first state (first angular position).

FIG. 1B is a view as viewed in the direction indicated by the arrow B of FIG. 1A.

FIG. 1C is a view as viewed in the direction indicated by the arrow C of FIG. 1A.

DETAILED DESCRIPTION

An embodiment of the present application is described with reference to the drawings.

FIG. 1A is a front elevation of an imaging apparatus 10, and in which the apparatus is in a first angular position. FIG. 1B is a view as viewed in the direction indicated by the arrow B of FIG. 1A. FIG. 1C is a view as viewed in the direction indicated by the arrow C of FIG. 1A.

Figure 2A:
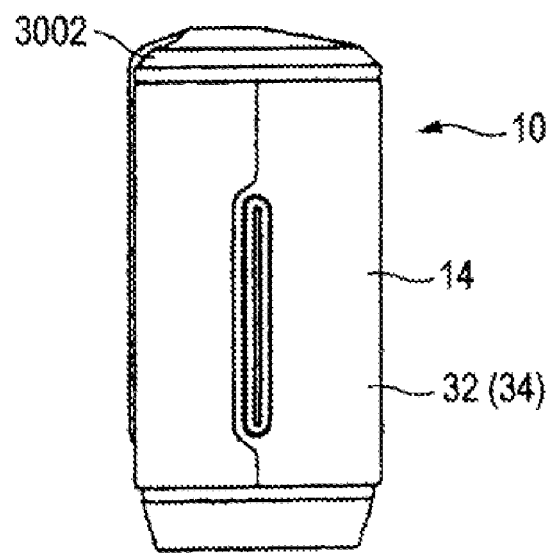
FIG. 2A is a view as viewed in the direction indicated by the arrow D of FIG. 1A.
Figure 2B:
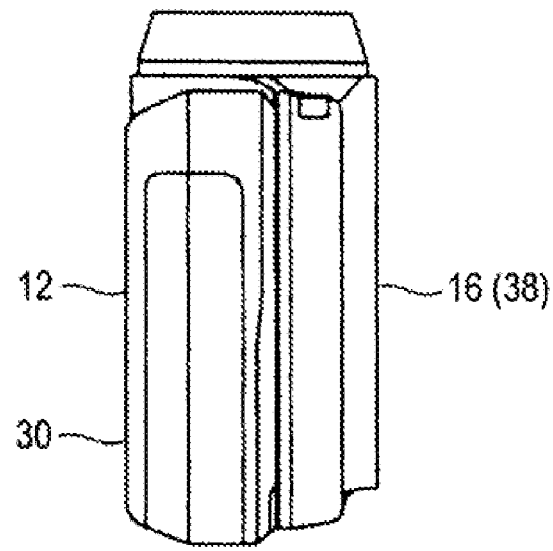
FIG. 2B is a view as viewed in the direction indicated by the arrow E of FIG. 1A.

FIG. 2A is a view as viewed in the direction indicated by the arrow D of FIG. 1A. FIG. 2B is a view as viewed in the direction indicated by the arrow E of FIG. 1A.

Figure 3A:
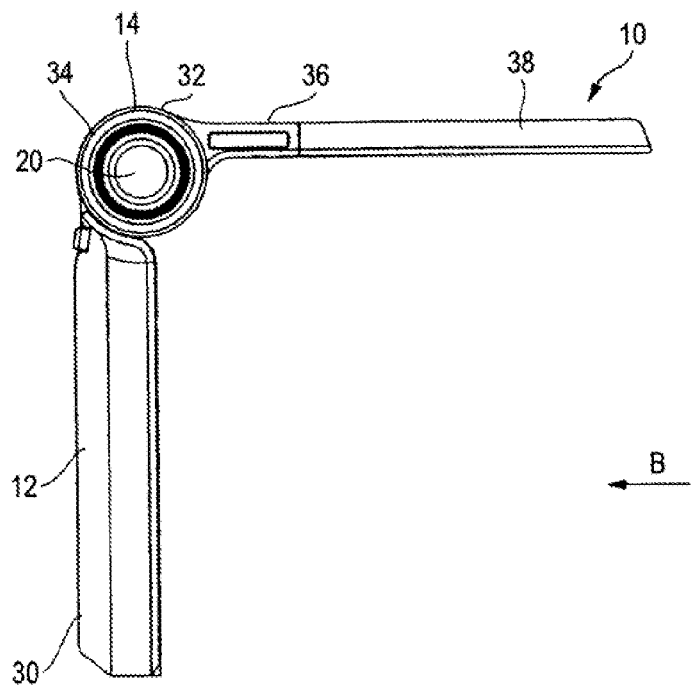
FIG. 3A is a front elevation of the imaging apparatus 10, and in which a monitor portion 16 has been rotated through 90° about a first axis O1.
Figure 3B:
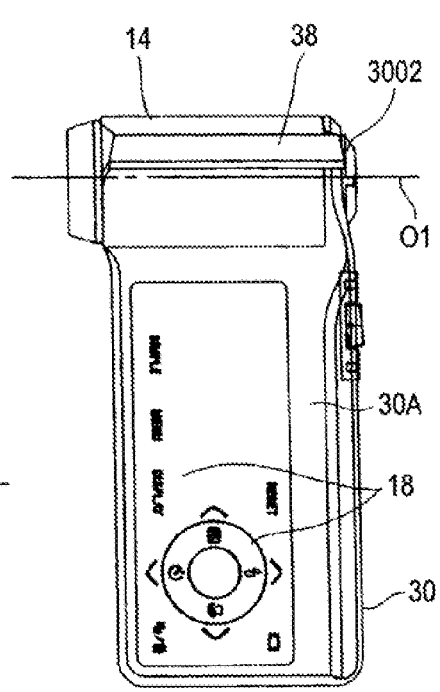
FIG. 3B is a view as viewed in the direction indicated by the arrow B of FIG. 3A.

FIG. 3A is a front elevation of the imaging apparatus 10, and in which the monitor portion 16 has been rotated through 90° about a first axis O1. FIG. 3B is a view as viewed in the direction indicated by the arrow B of FIG. 3A.

Figure 4C:
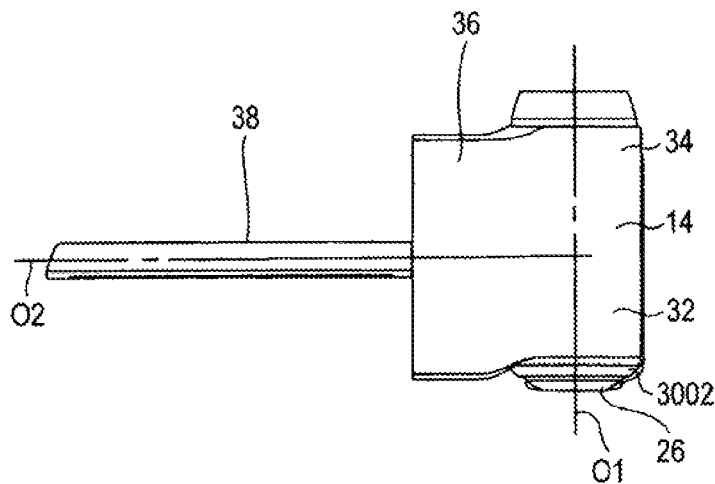
FIG. 4C is a view as viewed in the direction indicated by the arrow C of FIG. 4A.
Figure 4B:
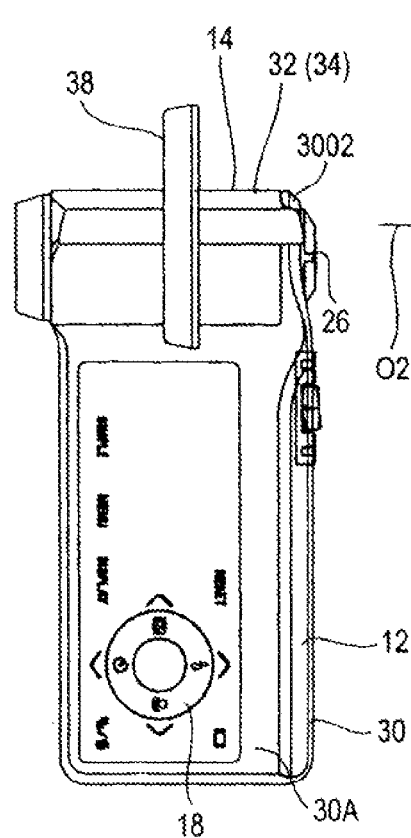
FIG. 4B is a view as viewed in the direction indicated by the arrow B of FIG. 4A.
Figure 4A:
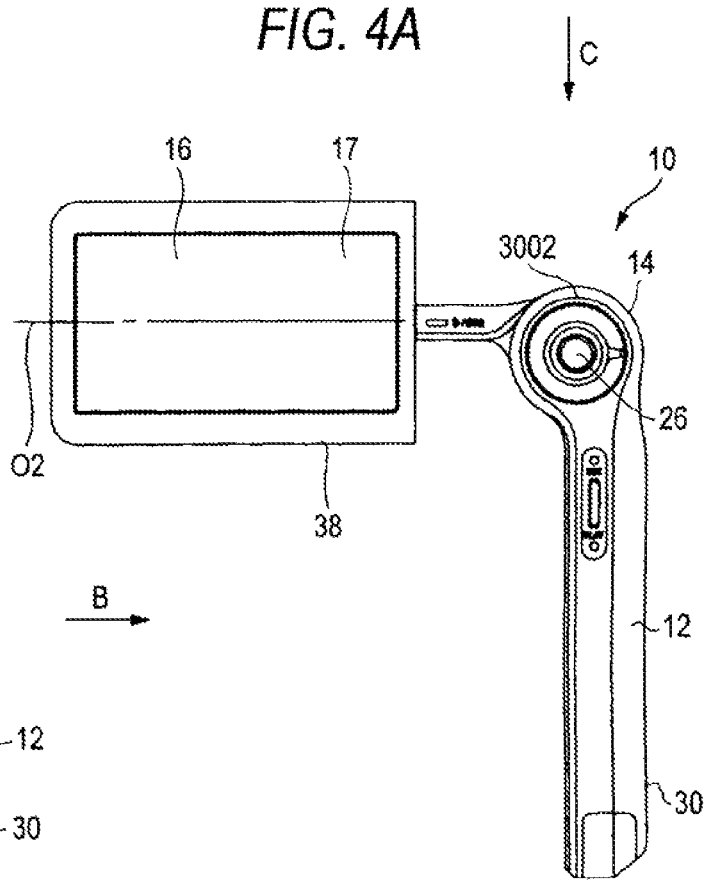
FIG. 4A is a rear view of the imaging apparatus 10, and in which the monitor portion 16 has been rotated through 90° about a second axis O2 from the state of FIG. 3A.

FIG. 4A is a rear view of the imaging apparatus 10, and in which the monitor portion 16 has been rotated through 90° about a second axis O2 from the state of FIG. 3A. FIG. 4B is a view as viewed in the direction indicated by the arrow B of FIG. 4A. FIG. 4C is a view as viewed in the direction indicated by the arrow C of FIG. 4A.

Figure 5:
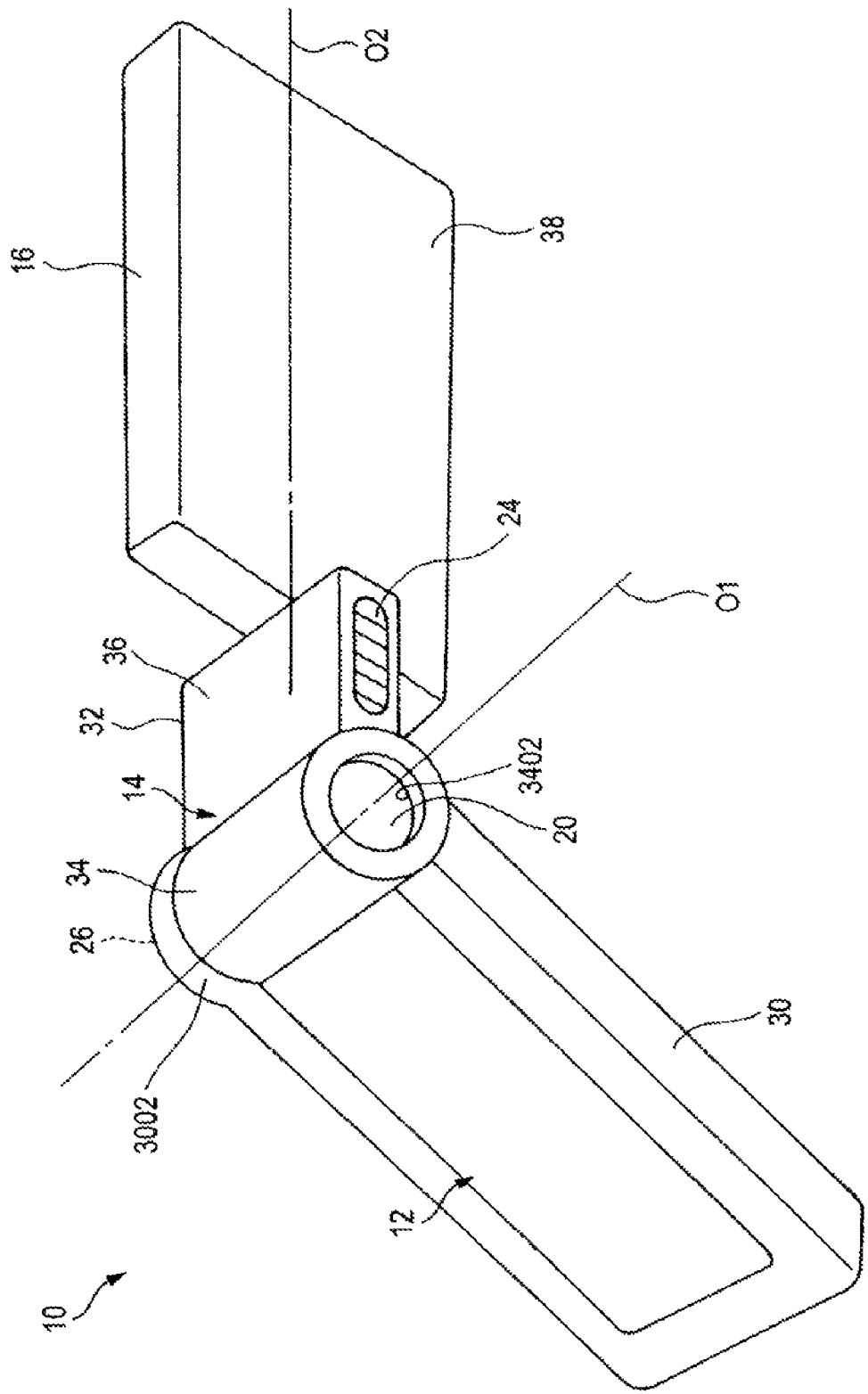
FIG. 5 is a perspective view of the imaging apparatus 10, and in which a camera portion casing 32 is opened relative to a grip portion casing 30 about the first axis O1, and in which a monitor portion casing 38 has been rotated relative to the camera portion casing 32 about the second axis O2.

FIG. 5 is a perspective view of the imaging apparatus 10 under the condition in which the camera portion casing 32 is opened relative to a grip portion casing 30 about the first axis O1, and in which a monitor portion casing 38 has been rotated relative to the camera portion casing 32 about the second axis O2.

Figure 6:
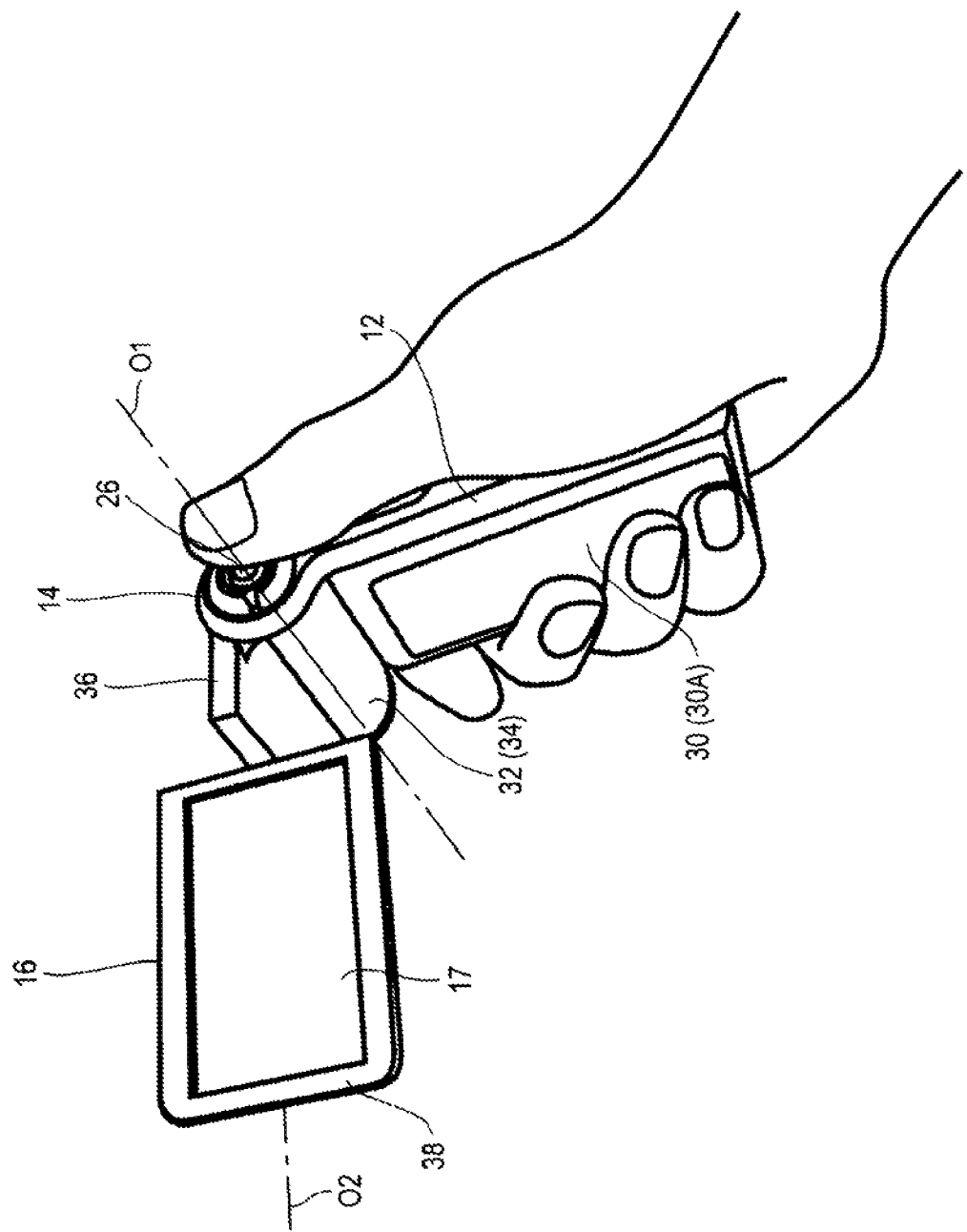
FIG. 6 is a perspective view of the imaging apparatus 10, and in which the grip portion case 30 has been gripped, the camera portion casing 32 has been opened relative to the grip portion casing 30 about the first axis O1, and the monitor portion casing 38 has been rotated relative to the camera portion casing 32 about the second axis O2.

FIG. 6 is a perspective view of the imaging apparatus 10 under the condition in which the grip portion casing 30 is gripped. Furthermore, the camera portion casing 32 is opened relative to the grip portion casing 30 about the first axis O1. In addition, the monitor portion casing 38 has been rotated relative to the camera portion casing 32 about the second axis O2.

Figure 7:
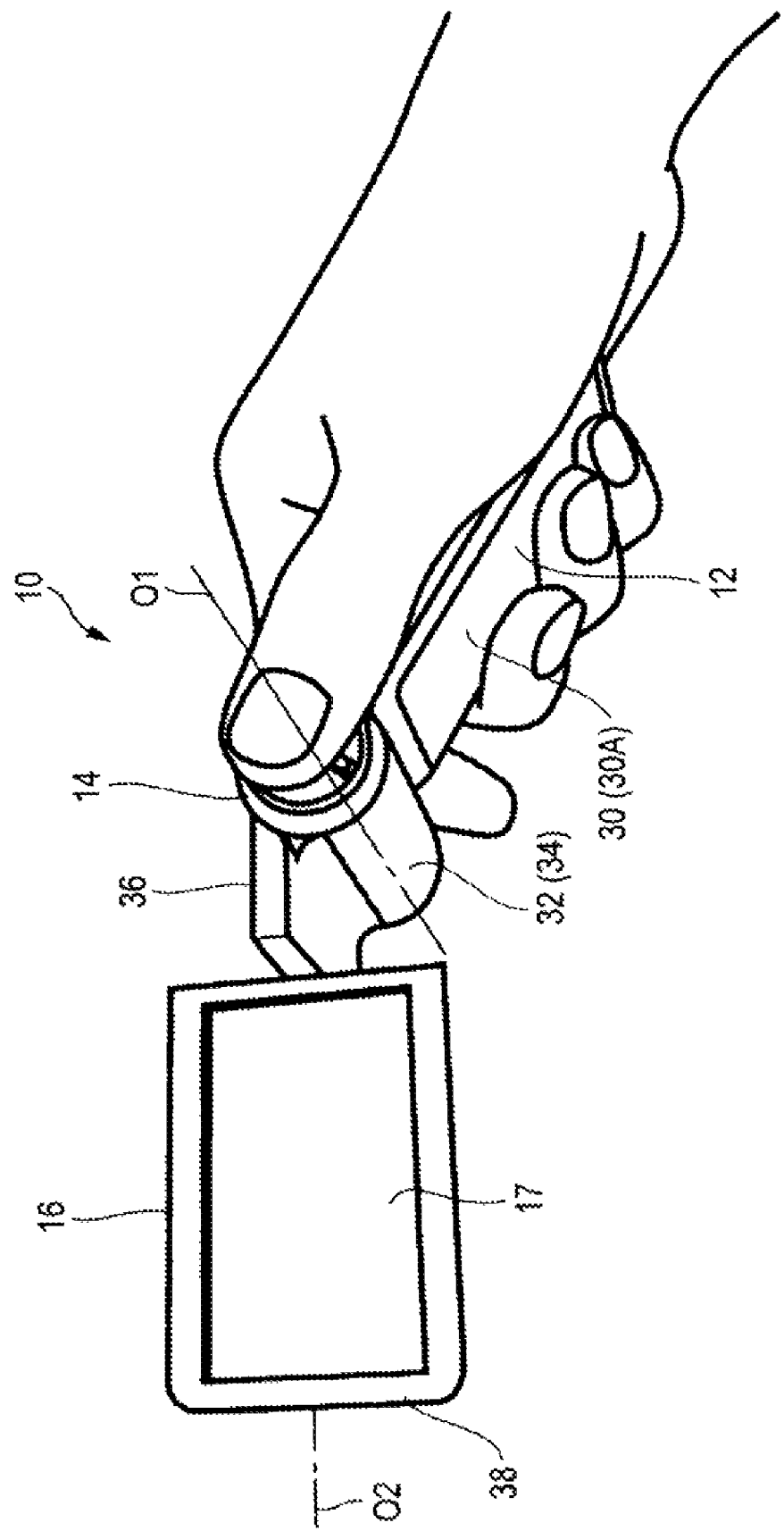
FIG. 7 is a perspective view of the imaging apparatus 10, and in which the grip portion casing 30 has been gripped, the camera portion casing 32 has been opened further from the state of FIG. 6 relative to the grip portion casing 30 about the first axis O1, and the monitor portion casing 38 has been rotated relative to the camera portion casing 32 about the second axis O2.

FIG. 7 is a perspective view of the imaging apparatus 10 under the condition in which the grip portion casing 30 has been gripped. Furthermore, the camera portion casing 32 is opened relative to the grip portion casing 30 about the first axis O1 from the state of FIG. 6. In addition, the monitor portion casing 38 has been rotated relative to the camera portion casing 32 about the second axis O2.

Figure 8:
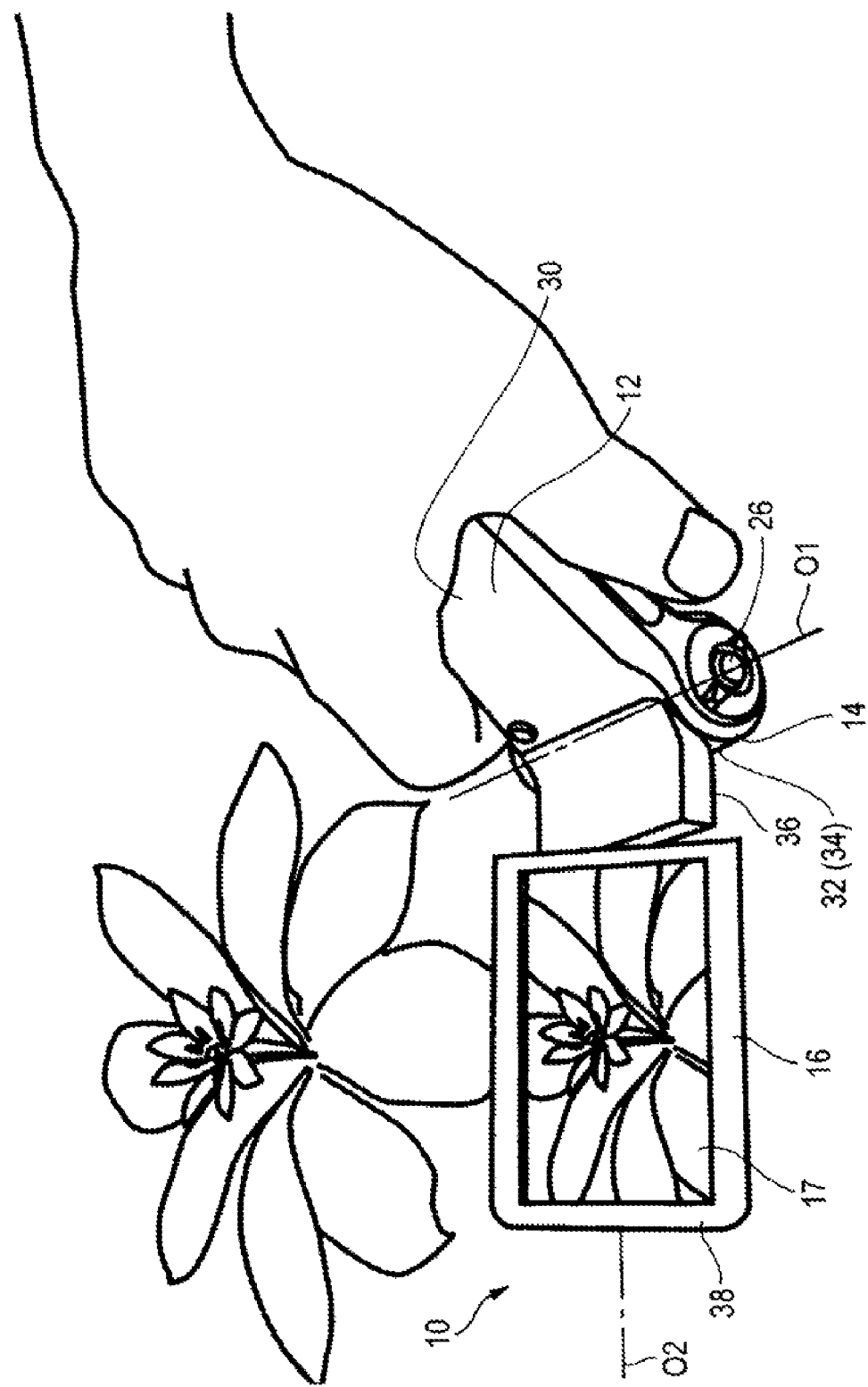
FIG. 8 is a perspective view of the imaging apparatus 10, and in which the grip portion casing 30 has been gripped such that the camera portion casing 32 is placed at a lower position, the camera portion casing 32 has been opened relative to the grip portion casing 30 about the first axis O1, and the monitor portion casing 38 has been rotated relative to the camera portion casing 32 about the second axis O2.

FIG. 8 is a perspective view of the imaging apparatus 10 under the condition in which the grip portion casing 30 has been gripped such that the camera portion casing 32 is placed at a lower position. Furthermore, the camera portion casing 32 is opened relative to the grip portion casing 30 about the first axis O1. In addition, the monitor portion casing 38 has been rotated relative to the camera portion casing 32 about the second axis O2.

Figure 9:
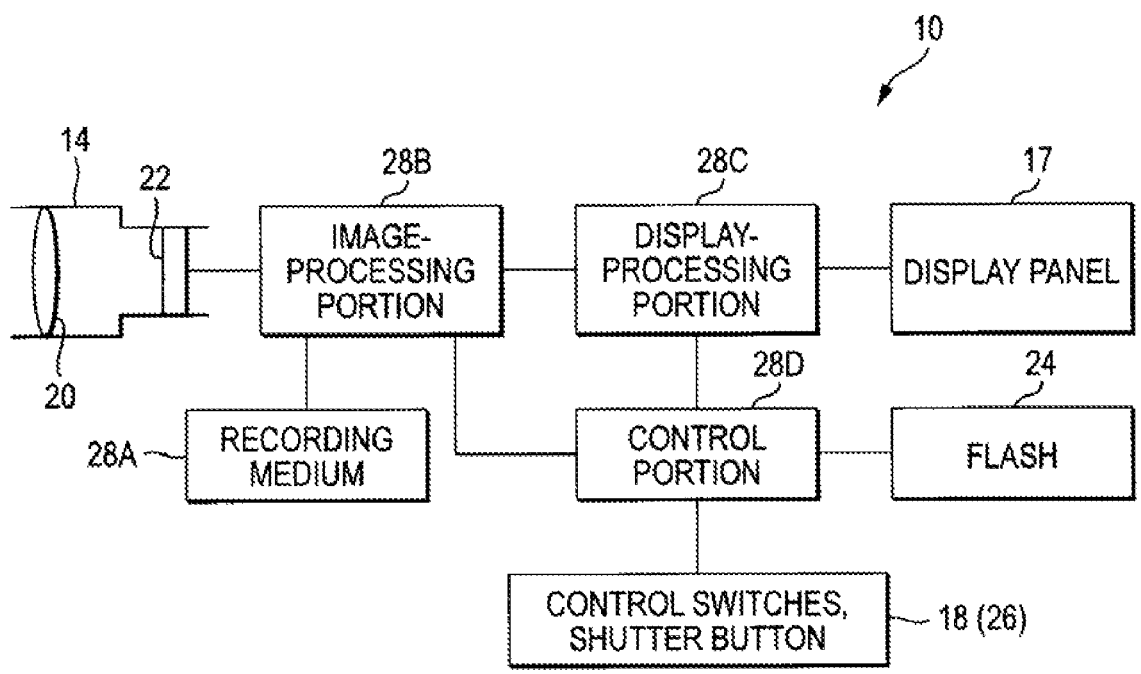
FIG. 9 is a block diagram of the imaging apparatus 10, showing the structure.

FIG. 9 is a block diagram of the imaging apparatus 10, showing the structure.

As shown in FIGS. 1A-4B, the imaging apparatus 10 according to the present embodiment is a digital still camera that is designed including a grip portion 12, a camera portion 14, and a monitor portion 16.

In the present specification, the front side is a side of a subject. The rear side is a side of a focused image. The left and right sides of the imaging apparatus 10 are taken from the front side.

As shown in FIG. 3B, the imaging apparatus 10 has a plurality of control switches 18 for performing various manipulations associated with photography and for turning on/off of the power supply.

The control switches 18 can be designed at will. For example, they can be push-button switches or touch switches. Alternatively, they may be made of a touch-panel display composed of a display unit and a touch panel formed on the surface of the display unit.

As shown in FIG. 1A, the camera portion 14 has an imaging optical system 20 and an imaging device 22 (see FIG. 9) for capturing an image of a subject guided by the imaging optical system 20.

Furthermore, in the present embodiment, the imaging apparatus 10 has a flash 24 for emitting imaging fill light (flashlight) to the subject as shown in FIG. 1A. In addition, as shown in FIGS. 1C and 4A, the apparatus has a shutter button 26.

As shown in FIG. 4A, the monitor portion 16 has a display panel 17 for displaying images captured by the camera portion 14 and images read from a recording medium 28A.

Various well-known display units such as liquid crystal display panel and organic electroluminescence display panel can be used as the display panel 17.

The control system of the imaging apparatus 10 is next described by referring to FIG. 9.

The imaging apparatus 10 includes the imaging device 22 for capturing an image of a subject focused by the imaging optical system 20, an image-processing portion 28B for creating image data based on an imaging signal output from the imaging device 22 and recording the data onto the recording medium 28A such as a memory card, a display-processing portion 28C for displaying the image data as a visible image on the display panel 17, and a control portion 28D including a CPU for controlling the image-processing portion 28B, display-processing portion 28C, and flash 24 in response to manipulations of the shutter button 26 and control switches 18. The imaging device 22 is made of a CCD or CMOS sensor.

The structure of the imaging apparatus 10 is next described in detail.

As shown in FIGS. 1A, 1B, 2E, 3A, 4A, and 5, the grip portion 12 has the grip portion casing 30 assuming a form of a flat plate having a width greater in dimension than its thickness and a length greater in dimension than the width.

The grip portion casing 30 has an inner surface 30A superimposed on a second casing portion 36 (described later) and the monitor portion casing 38. The control switches 18 are mounted on this inner surface 30A.

A support wall 3002 protrudes along the length of the grip portion casing 30 from the longitudinal end and widthwise end of the grip portion casing 30.

As shown in FIG. 5, the camera portion 14 is connected to the longitudinal end of the grip portion casing 30 so as to be rotatable about a first axis O1 extending in the direction of width of the grip portion casing 30.

The camera portion 14 has the camera portion casing 32.

The camera portion casing 32 has a first casing portion 34 and the second casing portion 36 protruding from the first casing portion 34.

The first casing portion 34 has a thickness greater in dimension than the thickness of the grip portion casing 30.

The first casing portion 34 is disposed at the longitudinal end of the grip portion casing 30. The first casing portion 34 extends in the direction of width of the grip portion casing 30.

In the present embodiment, the first casing portion 34 is cylindrical in shape as shown in FIG. 5. The imaging optical system 20 is incorporated in the first casing portion 34.

As shown in FIGS. 1A and 1C, the second casing portion 36 assumes a form of a flat plate having a thickness smaller in dimension than the thickness of the first casing portion 34, a width equal in dimension to the width of the first casing portion 34, and a length extending along the direction in which the second casing portion 36 protrudes from the first casing portion 34.

The camera portion 14 is connected to the longitudinal end of the grip portion casing 30 between the support wall 3002 and the first casing portion 34. Any of various well-known structures such as a structure utilizing a frictional force and a structure utilizing a clicking mechanism can be used for this connection.

In the present embodiment, the first axis O1 passes through the support wall 3002 and through the first casing portion 34.

The optical axis of the imaging optical system 20 is located on the first axis O1.

As shown in FIGS. 4B and 4C, the shutter button 26 is formed on the surface opposite to the surface of the support wall 3002 that faces the first casing portion 34.

As shown in FIGS. 1B and 5, the surface opposite to the surface of the first casing portion 34 that faces the support wall 3002 is provided with an opening 3402 for accepting an image of a subject into the imaging optical system 20.

The flash 24 is mounted on the surface of the second casing portion 36 that is on the same side as the surface in which the opening 3402 is formed as shown in FIGS. 1B and 5.

The imaging device 22 (FIG. 9) and flash 24 are elongated longitudinally of the second casing portion 36.

As shown in FIGS. 1B, 3, and 5, the monitor portion 16 is connected to the camera portion 14 so as to be rotatable integrally with the camera portion 14 relative to the camera portion 14 about the first axis O1. As shown in FIGS. 4A to 4C, the monitor portion is connected so as to be rotatable about a second axis O2 perpendicular to the first axis O1. Any of various well-known structures such as a structure utilizing a frictional force and a structure utilizing a clicking mechanism can be used as a structure by which the monitor portion 16 is connected to the camera portion 14 so as to be rotatable about the second axis O2.

As shown in FIGS. 1A, 1C, and 4A-4C, the monitor portion 16 has the monitor portion casing 38 in the form of a flat plate that has a thickness equal in dimension to the thickness of the second casing portion 36, a width equal in dimension to the width of the second casing portion 36, and a length greater in dimension than the width. The longitudinal direction of the second casing portion 36 is coincident with the longitudinal direction of the monitor portion casing 38 at all times.

The second axis O2 extends through the widthwise center of the first casing portion 34 and through the widthwise center of the monitor portion casing 38.

As shown in FIG. 4A the display panel 17 is mounted on the surface located at thicknesswise one end of the monitor portion casing 38.

As shown in FIGS. 1A, 1C, and 4, the display panel 17 has a length greater in dimension than the width corresponding to the monitor portion casing 38. The longitudinal direction of the display panel 17 is parallel to the longitudinal direction of the monitor portion casing 38.

Accordingly, in the present embodiment, the longitudinal direction of the monitor portion casing 38, the longitudinal direction of the imaging device 22, and the longitudinal direction of the flash 24 are coincident at all times. In other words, the longitudinal direction of the display panel 17, the longitudinal direction of the imaging device 22, and the longitudinal direction of the flash 24 are coincident at all times.

As shown in FIGS. 1A, 1C, and 2E, the second casing portion 36 and monitor portion casing 38 assume a first state in which the opposite end surfaces of the casing portion 36 and casing 38 spaced from each other in the direction of thickness extend in the same planes.

In this first state, if the camera portion 14 and monitor portion 16 are rotated about the first axis O1, the second casing portion 36 and monitor portion casing 38 are superimposed on the grip portion casing 30. The second casing portion 36, monitor portion casing 38, and grip portion casing 30 assume a form of a single flat plate.

A method of using the imaging apparatus 10 is next described.

First, where the imaging apparatus 10 is carried or received, the monitor portion casing 38 is rotated relative to the second casing portion 36 about the second axis O2 as shown in FIGS. 1C and 4C, and the second casing portion 36 and monitor portion casing 38 are placed in the first state in which the opposite end surfaces of the casing portion 36 and casing 38 spaced from each other in the direction of thickness extend in the same planes. Under this first state, the camera portion casing 32 and monitor portion casing 38 are rotated relative to the grip portion casing 30 about the first axis O1 such that the monitor portion casing 38 is superimposed on the inner surface 30A of the grip portion casing 30. The second casing portion 36, monitor portion casing portion 38, and grip portion casing 30 assume a form of a single flat plate. The outer contour can be made compact.

When photography is performed by the imaging apparatus 10, the grip portion casing 30 and monitor portion casing 38 superimposed like a single flat plate are gripped. The camera portion casing 32 and monitor portion casing 38 are rotated relative to the grip portion casing 30 about the first axis O1 and opened.

When the second casing portion 36 and monitor portion casing 38 are opened through an angle of about 90 degrees relative to the grip portion casing 30, the grip portion casing 30 is gripped as shown in FIG. 6. The imaging optical system 20 is directed forward. Then, the monitor portion casing 38 is rotated relative to the second casing portion 36 about the second axis O2. The display panel 17 is directed rearward (front side in the figure) to permit the display panel 17 to be checked visually.

Under this condition, the imaging optical system 20 is directed toward the subject. As a result, an image of the subject is displayed on the display panel 17. Consequently, photography is performed by determining the picture composition and manipulating the shutter button 26.

As described so far, according to the imaging apparatus 10 of the present embodiment, the camera portion 14 is connected to the longitudinal end of the grip portion casing 30 so as to be rotatable about the first axis O1 extending in the direction of width. The monitor portion 16 is connected to the camera portion 14 so as to be rotatable together with the camera portion 14 about the first axis O1. The monitor portion is connected so as to be rotatable about the second axis O2 perpendicular to the first axis O1. The optical axis of the imaging optical system 20 of the camera portion 14 is located on the first axis O1.

Accordingly, as shown in FIGS. 6 and 7, the display panel 17 is kept at rest while visually checking a desired subject. Under this condition, if the grip portion casing 30 is rotated about the first axis O1, the camera portion 14 does not rotate. Furthermore, the optical axis of the imaging optical system 20 is at rest. Consequently, none of the image displayed on the display panel 17, i.e., the image captured by the imaging device 22, and the picture composition vary.

Therefore, photography can be performed when the grip portion 12 has been rotated to an angular position where the grip portion can be easily gripped. This is advantageous in improving the controllability of the imaging apparatus 10.

For example, where a subject such as a flower located close to the ground is photographed, it is necessary to place the camera portion 14 close to the ground to bring the camera portion 14 close to the subject. Furthermore, in order to facilitate gripping the grip portion 12, it is necessary to place the grip portion 12 in a position spaced remotely from the ground.

In the imaging apparatus 10 of the present embodiment, the grip portion 12 is rotated about the first axis O1 while the camera portion 14 and monitor portion 16 are placed close to the ground as shown in FIG. 8. Hence, the grip portion 12 can be easily placed in a position which is spaced from the ground and in which the grip portion can be easily gripped. Accordingly, the display panel 17 can be placed in a position where the subject can be easily checked visually. At the same time, the grip portion 12 can be placed in a position where the grip portion can be easily gripped. This is advantageous in improving the controllability of the imaging apparatus 10.

Furthermore, in the present embodiment, the longitudinal direction of the imaging device 22, the longitudinal direction of the display panel 17, and the longitudinal direction of the flash 24 are all coincident with each other at all times.

Therefore, if the longitudinal direction of the second casing portion 36 of the camera portion 14 is faced horizontally and if the longitudinal direction of the monitor portion casing 38 is faced horizontally to photograph a subject that is elongated, for example, in the horizontal direction, the longitudinal direction of the flash 24 is also faced horizontally. Therefore, imaging fill light from the flash 24 spreads horizontally and illuminates the horizontally elongated subject uniformly. Accordingly, the totally illuminated, horizontally elongated subject can be imaged by the imaging device 22 extending in the same direction. This is advantageous in obtaining a clear image.

Furthermore, if the longitudinal direction of the second casing portion 36 of the camera portion 14 is directed vertically and if the longitudinal direction of the monitor portion casing 38 is directed vertically to photograph a vertically elongated subject, the longitudinal direction of the flash 24 is also directed vertically and so imaging fill light from the flash 24 spreads out vertically and illuminates the vertically elongated subject uniformly. Accordingly, the totally illuminated, vertically elongated subject can be imaged by the vertically elongated imaging device 22. This is advantageous in obtaining a clear image.

That is, the longitudinal direction of the imaging device 22, the longitudinal direction of the display panel 17, and the longitudinal direction of the flash 24 are all coincident at all times. Therefore, where the longitudinal direction of the display panel 17 is made coincident with the longitudinal direction of the subject the imaging fill light from the flash 24 spreads out longitudinally of the subject at all times and illuminates the subject. Consequently, the totally illuminated subject can be imaged by the imaging device 22 extending in the same direction as the longitudinal direction of the subject. This is advantageous in obtaining a clear image.

In the description of the present embodiment, a digital still camera is used as the imaging apparatus 10. The present invention can be applied to video camera, other various imaging devices, and portable electronic appliances equipped with an imaging apparatus.

Figure 10:
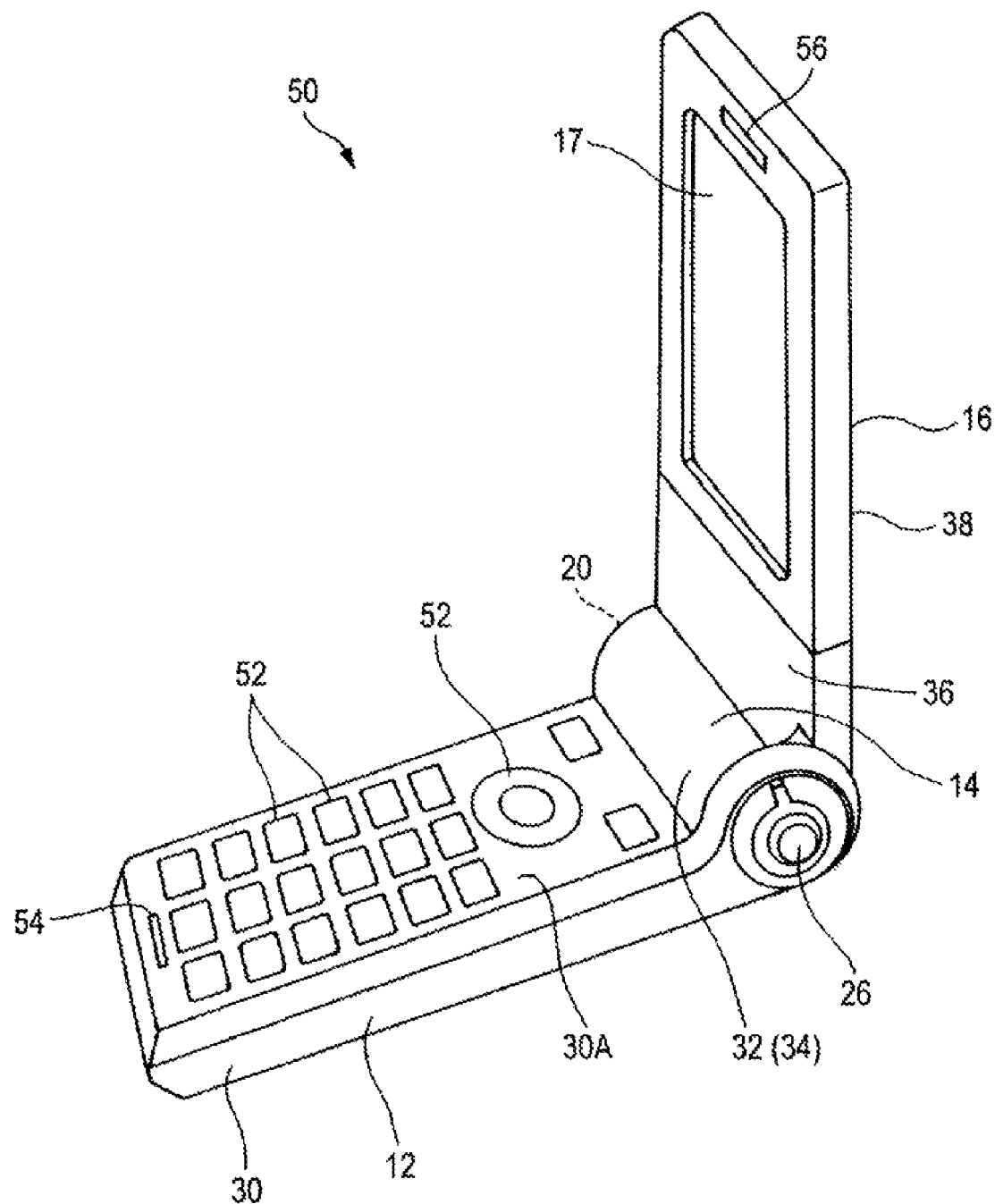
FIG. 10 is an explanatory view of a cell phone 50 according to an embodiment.

For example, as shown in FIG. 10, the present invention can be applied to a cell phone 50 equipped with a camera. In FIG. 10, the same parts and the same members as their counterparts of the embodiment described above are indicated by the same reference numerals as in the description of the above embodiment and their description is omitted.

In this case, the cell phone 50 includes a grip portion 12, a camera portion 14, and a monitor portion 16 in the same way as the imaging apparatus 10. Control switches 52 including a ten key and functional keys are mounted on the inner surface 30A of the grip portion casing 30 to permit manipulations of the cell phone.

A microphone 54 is mounted at an end of the grip portion casing 30. A speaker 56 is mounted at an end of the monitor portion 16.

The cell phone 50 designed in this way yields the same advantages as the above-described embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging apparatus comprising:
a grip portion;
a camera portion having an imaging optical system and an imaging device for capturing an image of a subject guided by the imaging optical system;
a monitor portion for displaying the image captured by the camera portion and having a monitor casing portion having a width substantially equal to a width of the grip portion; and
a flash for emitting imaging fill light;
wherein the grip portion has a grip portion casing in the form of a flat plate, the grip portion casing having a width greater in dimension than its thickness and a length greater in dimension than the width;
wherein the camera portion is connected to a longitudinal end of the grip portion casing so as to be rotatable about a first axis extending in the direction of the width;
wherein the monitor portion is connected to the camera portion so as to be rotatable together with the camera portion about the first axis and is connected so as to be rotatable about a second axis perpendicular to the first axis, the second axis extending through the widthwide center of the monitor casing portion;
wherein the flash is elongated longitudinally and is rotatable together with the camera portion and the monitor portion such that a longitudinal direction of the monitor portion, a longitudinal direction of the imaging device, and a longitudinal direction of the flash are coincident at all times; and
wherein the imaging optical system of the camera portion has an optical axis located on the first axis.

2. An imaging apparatus as set forth in claim 1,
wherein the camera portion has a camera portion casing including a first casing portion and a second casing portion, the imaging optical system being accommodated in the first casing portion, the first casing portion having a thickness greater in dimension than the thickness of the grip portion casing, the second casing portion assuming a form of a flat plate protruding from the first casing portion with a thickness smaller in dimension than the thickness of the first casing portion;
wherein the first casing portion is disposed at a longitudinal end of the grip portion casing and extends in the direction of width of the grip portion casing; and
wherein the first axis extends through the first casing portion.

3. An imaging apparatus as set forth in claim 1,
wherein the camera portion has a camera portion casing including a first casing portion and a second casing portion, the imaging optical system being accommodated in the first casing portion, the first casing portion having a thickness greater in dimension than the thickness of the grip portion casing, the second casing portion assuming a form of a flat plate protruding from the first casing portion with a thickness smaller in dimension than the thickness of the first casing portion;
wherein the first casing portion is disposed at a longitudinal end of the grip portion casing and extends widthwise of the grip portion casing;
wherein a support wall protrudes from a longitudinal end and a widthwise end of the grip portion casing and extends in the longitudinal direction;
wherein the camera portion is connected to the longitudinal end of the grip portion casing between the support wall and the first casing portion; and
wherein the first axis extends through the support wall and through the first casing portion.

4. An imaging apparatus as set forth in claim 3,
wherein a shutter button is mounted on a surface of the support wall opposite to the surface that faces the first casing portion.

5. An imaging apparatus as set forth in claim 3,
wherein a surface of the first casing portion opposite to the surface that faces the support wall is provided with an opening for accepting the image of the subject into the imaging optical system.

6. An imaging apparatus as set forth in claim 3,
wherein a surface of the first casing portion opposite to the surface that faces the support wall is provided with an opening for accepting the image of the subject into the imaging optical system; and
wherein the flash for emitting imaging fill light is mounted on the surface of the second casing portion on the same side as the surface in which the opening is formed.

7. An imaging apparatus as set forth in claim 1,
wherein the camera portion has a camera portion casing including a first casing portion and a second casing portion protruding from the first casing portion, the imaging optical system being accommodated in the first casing portion, the first casing portion having a thickness greater in dimension than the thickness of the grip portion casing;
wherein the first casing portion is disposed at a longitudinal end of the grip portion casing and has a width extending widthwise of the grip portion casing;
wherein the second casing portion has a thickness smaller in dimension than the thickness of the first casing portion, a width equal in dimension to the width of the first casing portion, and a length along the direction in which the second casing portion protrudes from the first casing portion;
wherein the first axis extends through the first casing portion;
wherein the monitor portion casing is in the form of a flat plate where a thickness and the width of the monitor portion casing are equal in dimension to the thickness and width of the second casing portion; and
wherein the second axis also extends through a widthwise center of the second casing portion.

8. An imaging apparatus as set forth in claim 1,
wherein the camera portion has a camera portion casing including a first casing portion and a second casing portion protruding from the first casing portion, the imaging optical system being accommodated in the first casing portion, the first casing portion having a thickness greater in dimension than the thickness of the grip portion casing;
wherein the first casing portion is disposed at a longitudinal end of the grip portion casing and has a width extending widthwise of the grip portion casing;
wherein the second casing portion has a thickness smaller in dimension than the thickness of the first casing portion, a width equal in dimension to the width of the first casing portion, and a length along the direction in which the second casing portion protrudes from the first casing portion;
wherein a support wall protrudes from a longitudinal end and a widthwise end of the grip portion casing and extends in the longitudinal direction;
wherein the camera portion is connected to the longitudinal end of the grip portion casing between the support wall and the first casing portion;
wherein the first axis extends through the support wall and through the first casing portion;
wherein a surface of the first casing portion opposite to the surface that faces the support wall is provided with an opening for accepting the image of the subject into the imaging optical system;
wherein the flash for emitting imaging fill light is mounted on the surface of the second casing portion on the same side as the surface in which the opening is formed;
wherein the monitor portion casing is in the form of a flat plate where a thickness and the width of the monitor portion casing are equal to the thickness and width of the second casing portion and a length greater in dimension than the width;
wherein the second axis also extends through a widthwise center of the second casing portion;
wherein a display panel having a length greater in dimension than its width is mounted on a surface located at thicknesswise one end of the monitor portion casing; and
wherein the longitudinal direction of the display panel is parallel to the longitudinal direction of the monitor portion casing.

9. An imaging apparatus as set forth in claim 1,
wherein the camera portion has a camera portion casing including a first casing portion and a second casing portion protruding from the first casing portion, the imaging optical system being accommodated in the first casing portion, the first casing portion having a thickness greater in dimension than the thickness of the grip portion casing;

wherein the first casing portion is disposed at a longitudinal end of the grip portion casing and has a width extending widthwise of the grip portion casing;

wherein the second casing portion has a thickness smaller in dimension than the thickness of the first casing portion, a width equal in dimension to the width of the first casing portion, and a length along the direction in which the second casing portion protrudes from the first casing portion;

wherein the first axis extends through the first casing portion;

wherein the monitor portion has a monitor portion casing in the form of a flat plate where a thickness and the width of the monitor casing portion are equal in dimension to the thickness and width of the second casing portion and a length greater in dimension than the width;

wherein the second axis also extends through a widthwise center of the second casing portion;

wherein the second casing portion and the monitor portion casing assume a first state in which opposite end surfaces of the second casing portion and the monitor portion casing spaced from each other in the direction of thickness extend in the same planes; and wherein when the camera portion and monitor portion rotate about the first axis under the first state, the second casing portion and the monitor portion casing are superimposed on the grip portion casing, whereby the second casing portion, monitor portion casing, and the grip portion casing assume a form of a single flat plate.

* * * * *